US009380762B1

(12) United States Patent
Galea

(10) Patent No.: US 9,380,762 B1
(45) Date of Patent: Jul. 5, 2016

(54) ELEVATED BOWL STAND ASSEMBLY

(71) Applicant: Michael Galea, Colusa, CA (US)

(72) Inventor: Michael Galea, Colusa, CA (US)

( * ) Notice: Subject to any disclaimer, the term of this patent is extended or adjusted under 35 U.S.C. 154(b) by 161 days.

(21) Appl. No.: 14/458,194

(22) Filed: Aug. 12, 2014

(51) Int. Cl.
  *A01K 5/01* (2006.01)
  *B60R 11/00* (2006.01)

(52) U.S. Cl.
  CPC .............. *A01K 5/0107* (2013.01); *B60R 11/00* (2013.01); *B60R 2011/0052* (2013.01)

(58) Field of Classification Search
  CPC ..... A01K 5/0107; A01K 5/01; A01K 5/0114; A01K 39/01; A47G 7/044; A47G 7/045
  USPC ............. 119/61.53, 51.01, 52.1, 58, 60, 61.1, 119/61.5, 61.56, 61.57, 51.5, 174; 211/71.01, 85.29; 248/146, 150, 318, 248/317, 311.2, 339, 340, 341
  See application file for complete search history.

(56) References Cited

U.S. PATENT DOCUMENTS

| | | | | | |
|---|---|---|---|---|---|
| 1,881,065 | A | * | 10/1932 | Shirley | A01K 5/01 119/61.4 |
| 4,205,629 | A | * | 6/1980 | Wix | A01K 58/0114 119/51.5 |
| 4,798,170 | A | * | 1/1989 | DePiazzy | A01K 1/0356 119/61.57 |
| 5,000,124 | A | * | 3/1991 | Bergen | A01K 5/0114 119/63 |
| 5,144,912 | A | * | 9/1992 | Hammett | A01K 5/01 119/51.5 |
| D357,557 | S | * | 4/1995 | Piper | 248/206.1 |
| 5,501,176 | A | * | 3/1996 | Tully | A01K 5/0114 119/61.57 |
| 6,684,812 | B1 | * | 2/2004 | Tucker | A01K 5/02 119/51.01 |
| 6,945,502 | B2 | * | 9/2005 | Restifo | A45F 3/44 248/146 |
| 8,011,322 | B1 | * | 9/2011 | Jackson | A01K 39/012 119/52.2 |
| D695,974 | S | | 12/2013 | Young | |
| 2005/0072366 | A1 | * | 4/2005 | Hammer | A01K 5/0114 119/61.57 |
| 2005/0166852 | A1 | * | 8/2005 | Santa Cruz | A01K 5/01 119/51.03 |
| 2008/0308044 | A1 | * | 12/2008 | Tiemann | A01K 5/0114 119/61.5 |
| 2010/0147224 | A1 | * | 6/2010 | Aletti | B66F 11/00 119/61.57 |
| 2014/0060443 | A1 | * | 3/2014 | Swift | A01K 5/0114 119/61.56 |
| 2015/0308615 | A1 | * | 10/2015 | Neaves | A01K 1/035 119/61.57 |

* cited by examiner

*Primary Examiner* — Trinh Nguyen

(57) ABSTRACT

An elevated bowl stand assembly that is adaptable to attach to a tire of automobiles. The bowl stand assembly comprises a main rod member, a pair of bowls and a pair of struts. A plurality of strap members having a pair of first strap members that is attached to the main rod member and the pair of connecting rod members utilizing at least one mounting means and the pair of second strap members that is attached to the pair of connecting rod members utilizing the at least one mounting means. A horizontal supporting member is adapted to releasably hold the pair of second strap members and loop behind the tire of the automobiles. The plurality of strap members engages the main rod member to the tire thereby placing the main rod member and the pair of bowls in a suspended orientation.

20 Claims, 6 Drawing Sheets

ELEVATED BOWL STAND ASSEMBLY

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

This embodiment relates to pet accessories, and more particularly to a portable elevated bowl stand assembly that is adaptable to attach to a tire of automobiles.

DISCUSSION OF RELATED ART

One of the most common difficulties when traveling with a pet is that it is necessary to have a pet bowl holder to provide food and/or water to the animal, particularly when traveling long distances. Pet bowl holder has been available in a variety of different styles and designs. Some pet bowl assemblies placed inside a vehicle include a container having a lid removably attached to the bowl. The container is shaped and sized to dimensionally correspond to a shape and size of a recess of a cup holder in a console of a vehicle. The container is securely retained within the cup holder, and the triangular shaped bowl extends partially between the front vehicle seats. However, the pet bowl assembly is placed inside the vehicle which stains the vehicle and therefore the owner needs to spend time and effort in cleaning food scattered on the vehicle around the pet bowl.

An existing pet bowl holder for holding pet food with a gimbal mount for use in a moving environment, having a conventional food or water bowl used for a pet comprises multiple features to facilitate its use on a boat or similar moving vehicle is herein disclosed. However, the bowls are difficult or awkward to carry, making transport relatively cumbersome Another existing pet feeding apparatus comprises a pair of container portions adapted to receive food or water which are connected by a living hinge for folding the pet feeding apparatus into a compact package for travel. The container portions are threaded on their inner upper edge to accept a lid which seals the container portion when installed. The container portions include a bowl shaped section with a skirt extending downwardly and outward to a lower rim which is below the lowest extent of the container portion. However, the pet bowl is placed on a stable surface such as a floor. Moreover, the animal needs to stoop its head to ground level in order to eat or drink. Furthermore, dirt and insects may enter into the animal's food since the bowl is placed in contact with the ground. In addition, the user that feeds the pet is required to bend or stoop to retrieve the bowls for cleaning or replenishment.

Therefore, there is a need for an economical and improved elevated bowl assembly that is hung or suspended above the ground. Such an elevated bowl assembly would be attachable to a tire of an automobile. Such a needed elevated bowl assembly would be adapted to secure a plurality of bowls. Such a needed elevated bowl assembly would include straps that are attached to the folding main rod member to engage the elevated bowl assembly to the tire in a suspended orientation. Further the elevated bowl assembly would be easily installed and hung over the outside of the tire and a wheel of a vehicle. Furthermore, the main rod member would be folded when not in use for easy storage. Finally, the elevated bowl assembly would allow the user to feed animals while outside by placing the bowls at the proper height for the animals and also keeping the bowls free of contact with the ground mostly from dirt and insects. The present embodiment accomplishes these objectives.

SUMMARY OF THE DISCLOSURE

The present embodiment is an elevated bowl stand assembly that is adaptable to attach to a tire of automobiles. The elevated bowl stand assembly comprises a main rod member and a pair of bowls having an open top adapted to receive food or water. A horizontal rod member is attached to a pair of ends of the main rod member and a vertical rod member is attached between a mid portion of the main rod member and a mid portion of the horizontal rod member thereby forming a pair of struts. The pair of struts is adaptable to receive and removably hold the pair of bowls.

A pair of connecting rod members is attached to the main rod member utilizing a pair of coupling members. A plurality of strap members is attached to the main rod member and the pair of connecting rod members. The plurality of strap members includes a pair of first strap members and a pair of second strap members. The pair of first strap members is attached to the main rod member and the pair of connecting rod members utilizing at least one mounting means. Similarly, the pair of second strap members is attached to the pair of connecting rod members utilizing the at least one mounting means. The mounting means is selected from a group consisting of: a screw, rivet, bolt, and nail.

The elevated bowl stand assembly further comprises a horizontal supporting member that is releasably holds the pair of second strap members and loops behind a tire of an automobile. The pair of second strap members comprises at least one fastening means to adjust the length of the pair of second strap members. The plurality of strap members engages the main rod member to the tire thereby placing the main rod member and the pair of bowls in a suspended orientation.

The elevated bowl stand assembly is folded when not in use for easy storage. The elevated bowl stand assembly is easily assembled and used by a person to feed food and/or water to a pet. The user can transport the elevated bowl stand assembly with the pair of bowls from one area to another, as desired or needed. The elevated bowl stand assembly is intended to provide a safe and clean feeding station for animals during outdoor activities such as camping. The suspended nature of the elevated bowl stand assembly keeps the pair of bowls from being in contact with the ground, thus helps preventing dirt and insects from entering into animal's food.

The elevated bowl stand assembly provides a convenient and hygienic atmosphere for the animals while having food.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment. The following detailed descriptions should not be taken in a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
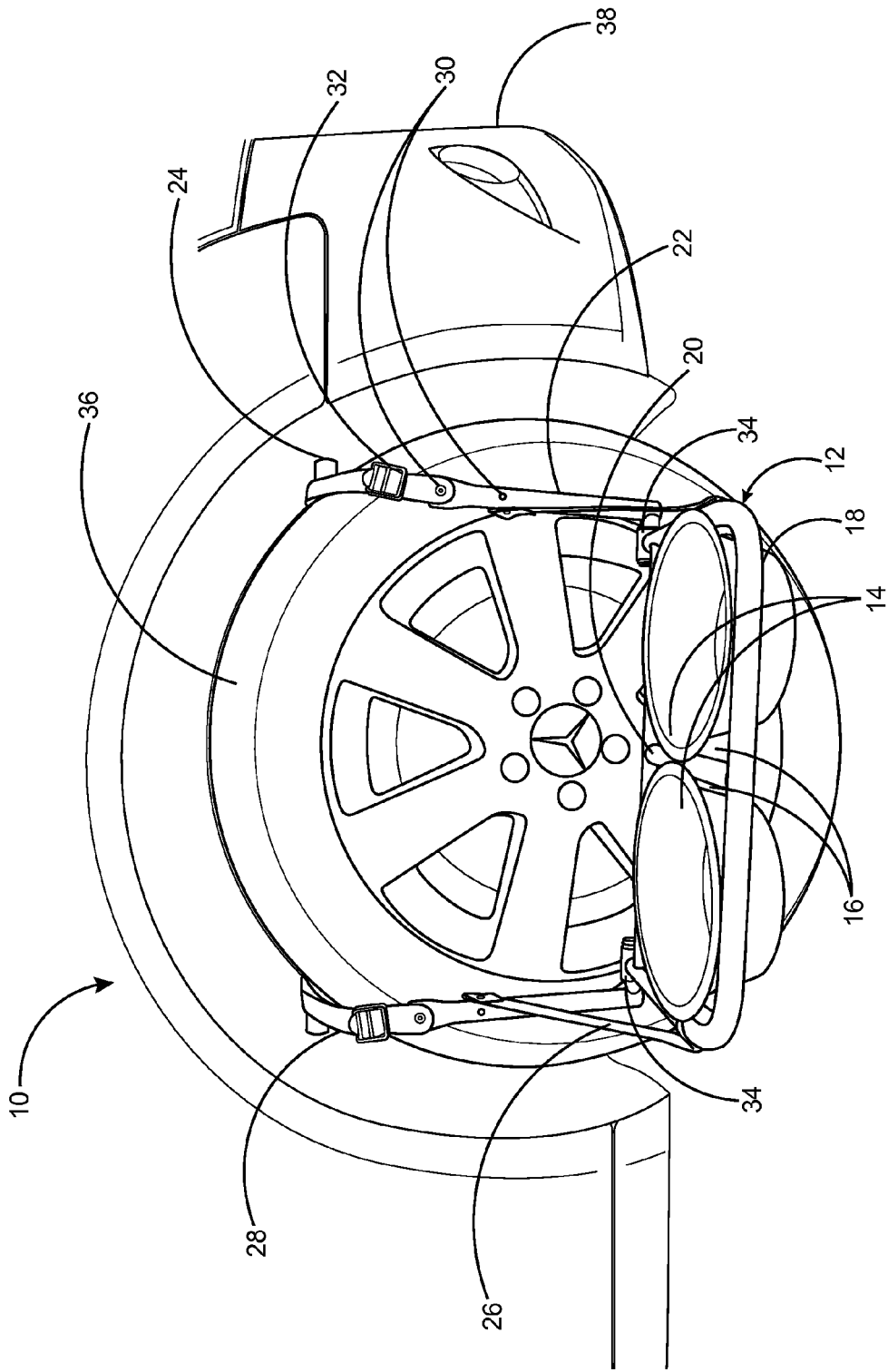
FIG. 1 illustrates a perspective view of an elevated bowl stand assembly attached to a tire of an automobile in accordance with a preferred embodiment of the present invention.
Figure 2:
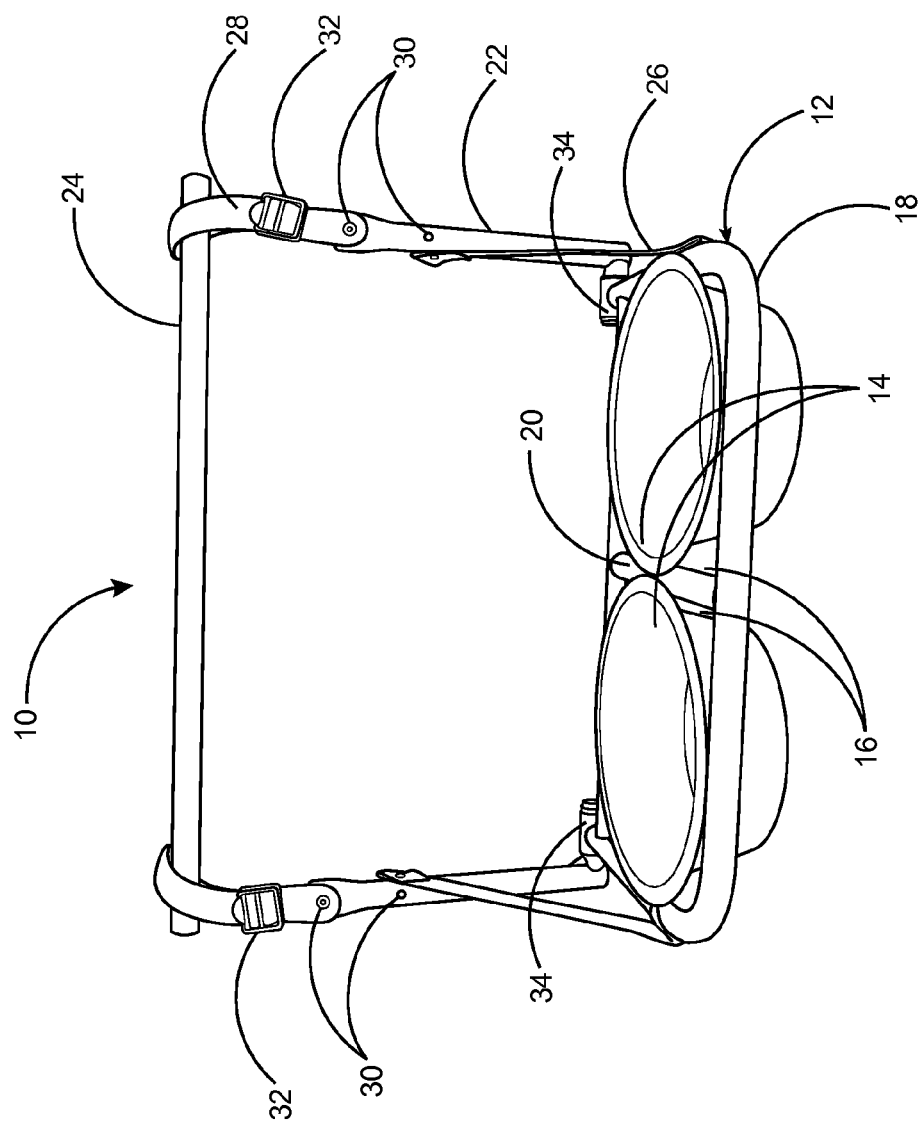
FIG. 2 illustrates a perspective view of the elevated bowl stand assembly in accordance with the preferred embodiment of the present invention.

FIGS. 1 and 2 illustrate perspective views of an elevated bowl stand assembly 10 in accordance with a preferred embodiment of the present invention. The elevated bowl stand assembly 10 comprises a Main rod member 12 and a pair of bowls 14 having an open top adapted to receive food or water. A horizontal rod member 18 is attached to a pair of ends of the main rod member 12 and a vertical rod member 20 is attached between a mid portion of the main rod member 12 and a mid portion of the horizontal rod member 18 thereby forming a pair of struts 16. The pair of struts 16 is adaptable to receive and removably hold the pair of bowls 14.

A pair of connecting rod members 22 is attached to the main rod member 12 utilizing a pair of coupling members 34. A plurality of strap members is attached to the main rod member and the pair of connecting rod members 22. The plurality of strap members includes a pair of first strap members 26 and a pair of second strap members 28. The pair of first strap members 26 is attached to the main rod member 12 and the pair of connecting rod members 22 utilizing at least one mounting means 30. Similarly, the pair of second strap members 28 is attached to the pair of connecting rod members 22 utilizing the at least one mounting means 30. The mounting means 30 is selected from a group consisting of: a screw, rivet, bolt, and nail. The elevated bowl stand assembly 10 further comprises a horizontal supporting member 24 that releasably holds the pair of second strap members 28 and loops behind a tire 36 of an automobile 38 as shown in FIG. 1. The pair of second strap members 28 comprises at least one fastening means 32 to adjust the length of the pair of second strap members 28. The plurality of strap members engages the main rod member 12 to the tire thereby placing the main rod member 12 and the pair of bowls 14 in a suspended orientation.

Figure 3:
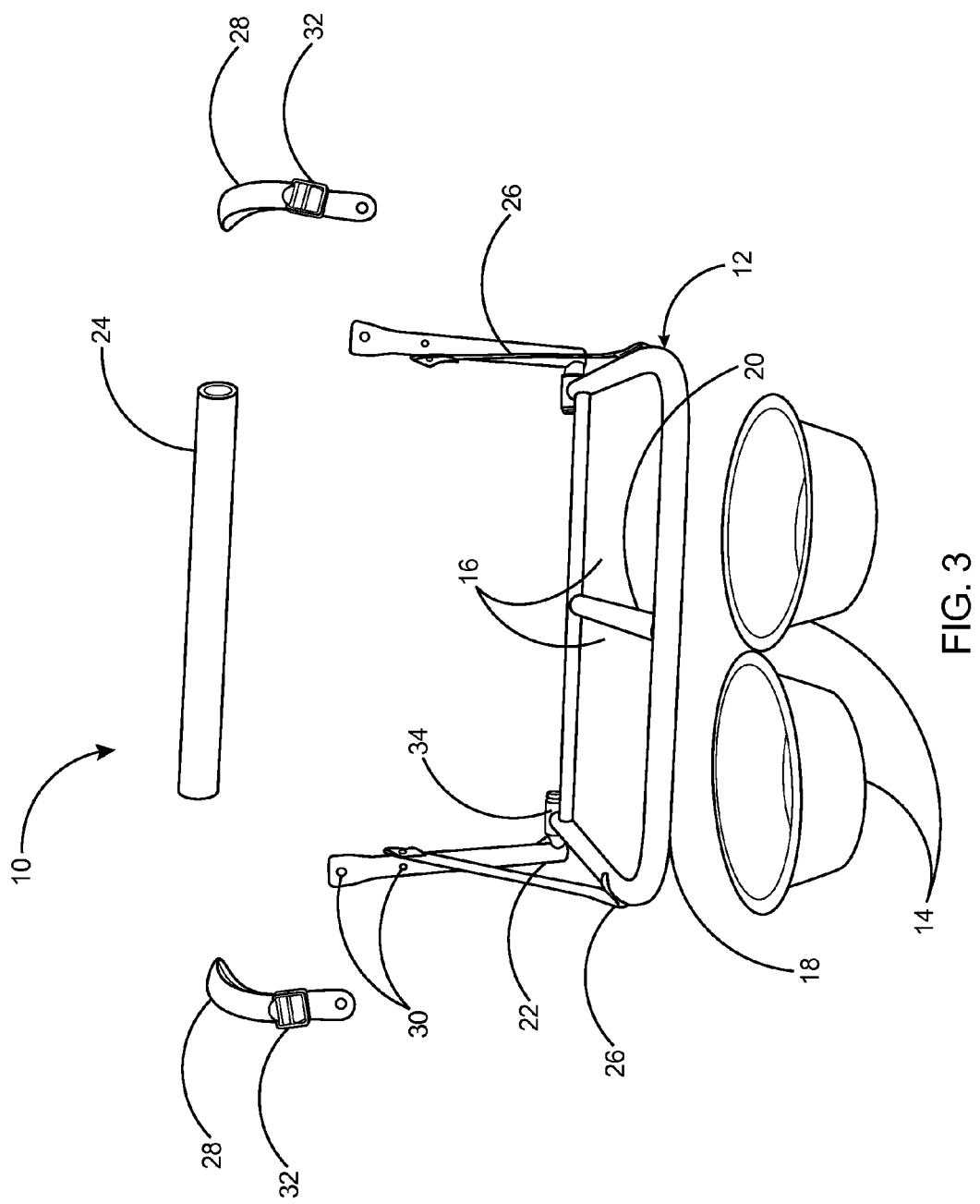
FIG. 3 illustrates an exploded view of the elevated bowl stand assembly in accordance with the preferred embodiment of the present invention.

Referring to FIG. 3 an exploded view of the elevated bowl stand assembly 10 in accordance with the preferred embodiment of the present invention is illustrated. The elevated bowl stand assembly 10 is folded when not in use for easy storage and shipping. The invention is intended to provide a safe and clean feeding station for animals during outdoor activities such as camping. The suspended nature of the elevated bowl stand assembly 10 keeps the pair of bowls 14 from being in contact with the ground, thus helps preventing dirt and insects from entering into animal's food.

Figure 4:
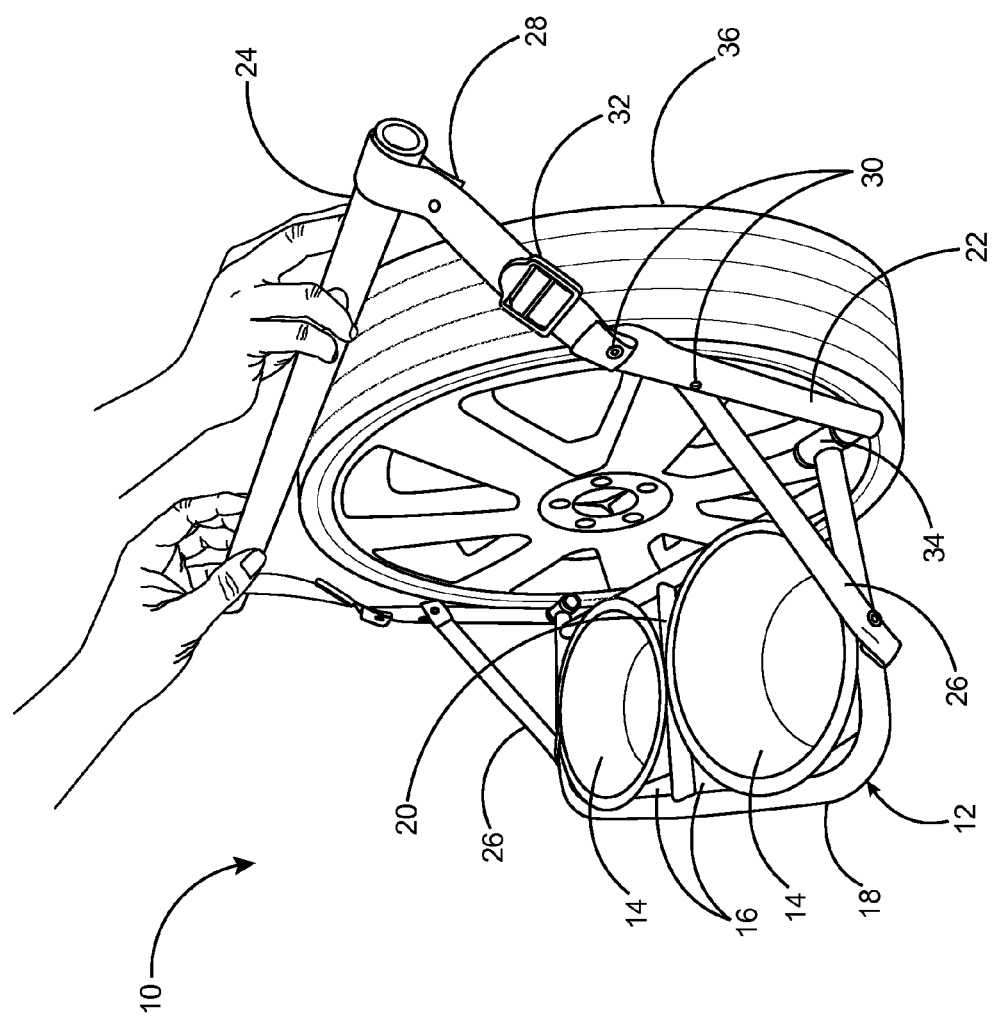
FIG. 4 illustrates a perspective view of the elevated bowl stand assembly, illustrating a user affixing the elevated bowl stand assembly behind the tire of the automobile in accordance with the preferred embodiment of the present invention.

FIG. 4 illustrates a perspective view of the elevated bowl stand assembly 10 illustrating a user affixing the elevated bowl stand assembly 10 behind the tire 36 of the automobile 38 in accordance with the preferred embodiment of the present invention. The user can hang the elevated bowl stand assembly 10 utilizing the horizontal supporting member 24 and the pair of second strap members 28 behind the tire of the automobiles 38. The plurality of strap members is made of nylon webbing. The elevated bowl stand assembly 10 is easily installable and removable.

Figure 5:
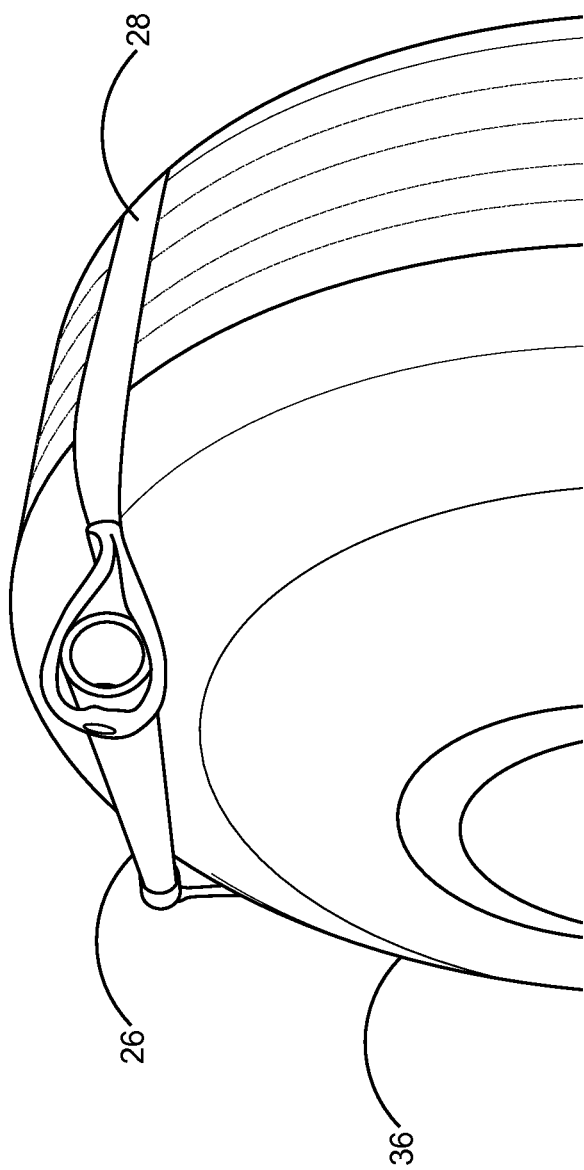
FIG. 5 illustrates a perspective view of the horizontal supporting member looped behind the tire of the automobile in accordance with the preferred embodiment of the present invention.

FIG. 5 illustrates a perspective view of the horizontal supporting member 24 attached behind the tire of the automobile 38 in accordance with the preferred embodiment of the present invention. Each strap member of the pair of second strap members 28 is looped at each end of the horizontal supporting member 24. Then, the horizontal supporting member 24 is looped behind the tire 36 of the automobiles 38. Thus, the elevated bowl stand assembly 10 is hung from the tire 36 of automobiles 38 and above a ground surface. The at least one fastening means 32 attached to the pair of second strap members 28 allows the user to adjust a proper height for feeding animals by keeping the pair of bowls free of contact with the ground mostly from dirt and insects. The fastening means 32 is selected from a group consisting of a hook and ring fastener, dual locking slide release, Velcro, adhesive and buckle means.

Figure 6:
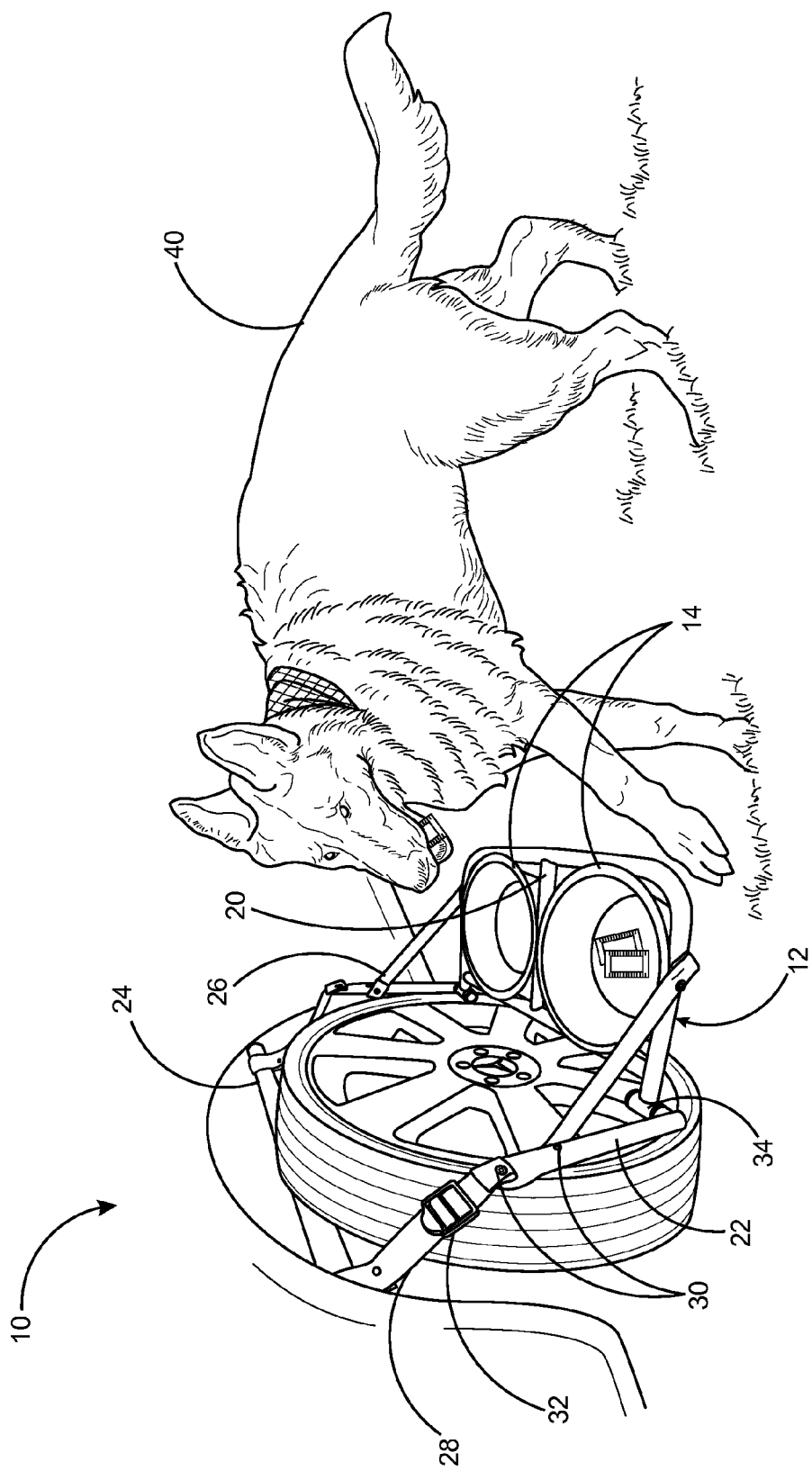
FIG. 6 illustrates a perspective view of the elevated bowl stand assembly when in use.

FIG. 6 illustrates a perspective view of the elevated bowl stand assembly 10 in use. The elevated bowl stand assembly 10 is easily assembled and used by a person to feed food and/or water to a pet. The user can transport the elevated bowl stand assembly 10 with the pair of bowls 14 from one area to another, as desired or needed. The elevated bowl stand assembly 10 provides a convenient and hygienic atmosphere for the animals while having food.

While a particular form of the invention has been illustrated and described, it will be apparent that various modifications can be made without departing from the spirit and scope of the invention. For example, the elevated bowl stand assembly 10 can be customized to fit with any automobile tires. Accordingly, it is not intended that the invention be limited, except as by the appended claims.

What is claimed is:

1. An elevated bowl stand assembly comprising:
   a main rod member;
   a pair of bowls;
   a pair of struts formed by attaching a horizontal rod member to a pair of ends of the main rod member and a vertical rod member attached between a mid portion of the main rod member and a mid portion of the horizontal rod member;
a pair of connecting rod members attached to the main rod member utilizing a pair of coupling members;
a plurality of strap members attached to the main rod member and the pair of connecting rod members; and
a horizontal supporting member being adapted to releasably hold the plurality of strap members and loop behind a tire of an automobile;
whereby the plurality of strap members engages the main rod member to the tire thereby placing the main rod member and the pair of bowls in a suspended orientation.

2. The elevated bowl stand assembly of claim 1 wherein the pair of struts is adaptable to receive and removably hold the pair of bowls.

3. The elevated bowl stand assembly of claim 1 wherein the plurality of strap members includes a pair of first strap members and a pair of second strap members.

4. The elevated bowl stand assembly of claim 3 wherein the pair of first strap members is attached to the main rod member and the pair of connecting rod members utilizing at least one mounting means and the pair of second strap members is attached to the pair of connecting rod members utilizing the at least one mounting means.

5. The elevated bowl stand assembly of claim 4 wherein at least one mounting means is selected from a group consisting of: a screw, rivet, bolt and nail.

6. The elevated bowl stand assembly of claim 1 wherein the pair of second strap members comprises at least one fastening means that allow a user to adjust a proper height for feeding animals by keeping the pair of bowls free of contact with the ground mostly from dirt and insects.

7. The elevated bowl stand assembly of claim 1 wherein at least one fastening means is selected from a group consisting of: a hook and, ring fastener, dual locking slide release, Velcro, adhesive and buckle means.

8. The elevated bowl stand assembly of claim 1 wherein the pair of bowls having an open top that is adapted to receive food or water.

9. The elevated bowl stand assembly of claim 1 is folded when not in use for easy storage and shipping.

10. The elevated bowl stand assembly of claim 1 wherein the plurality of strap members is made of nylon webbing.

11. An elevated bowl stand assembly comprising:
a main rod member;
a pair of bowls;
a pair of struts formed by attaching a horizontal rod member to a pair of ends of the main rod member and a vertical rod member attached between a mid portion of the main rod member and a mid portion of the horizontal rod member;
a pair of connecting rod members attached to the main rod member utilizing a pair of coupling members;
a plurality of strap members having a pair of first strap members and a pair of second strap members, the pair of first strap members being attached to the main rod member and the pair of connecting rod members utilizing at least one mounting means, the pair of second strap members being attached to the pair of connecting rod members utilizing at least one mounting means; and
a horizontal supporting member being adapted to releasably hold the plurality of strap members and loop behind a tire of an automobile;
whereby the plurality of strap members engages the main rod member to the tire thereby placing the main rod member and the pair of bowls in a suspended orientation.

12. The elevated bowl stand assembly of claim 11 wherein the pair of struts is adaptable to receive and removably hold the pair of bowls.

13. The elevated bowl stand assembly of claim 11 wherein the pair of second strap members comprises at least one fastening means that allow a user to adjust a proper height for feeding animals by keeping the pair of bowls free of contact with the ground mostly from dirt and insects.

14. The elevated bowl stand assembly of claim 13 wherein the at least one fastening means is selected from a group consisting of: a hook and, ring fastener, dual locking slide release, Velcro, adhesive and buckle means.

15. The elevated bowl stand assembly of claim 11 wherein the at least one mounting means is selected from a group consisting of: a screw, rivet, bolt and nail.

16. The elevated bowl stand assembly of claim 11 wherein the pair of bowls having an open top that is adapted to receive food or water.

17. An elevated bowl stand assembly for attaching to a tire of an automobile comprising:
a substantially U-shaped main rod member;
a pair of bowls having an open top being adapted to receive food or water;
a pair of struts formed by attaching a horizontal rod member to a pair of ends of the main rod member and a vertical rod member attached between a mid portion of the main rod member and a mid portion of the horizontal rod member, the pair of struts being adaptable to receive and removably hold the pair of bowls;
a pair of connecting rod members attached to the main rod member utilizing a pair of coupling members;
a plurality of strap members having a pair of first strap members and a pair of second strap members, the pair of first strap members being attached to the main rod member and the pair of connecting rod members utilizing at least one mounting means, the pair of second strap members being attached to the pair of connecting rod members utilizing the at least one mounting means; and
a horizontal supporting member being adapted to releasably hold the plurality of strap members and loop behind the tire of the automobile;
whereby the plurality of strap members engages the main rod member to the tire thereby placing the main rod member and the pair of bowls in a suspended orientation.

18. The elevated bowl stand assembly of claim 17 wherein the pair of second strap members comprises at least one fastening means that allow a user to adjust a proper height for feeding animals by keeping the pair of bowls free of contact with the ground mostly from dirt and insects.

19. The elevated bowl stand assembly of claim 18 wherein the at least one fastening means is selected from a group consisting of: a hook and, ring fastener, dual locking slide release, Velcro, adhesive and buckle means.

20. The elevated bowl stand assembly of claim 17 wherein the at least one mounting means is selected from a group consisting of: a screw, rivet, bolt and nail.

* * * * *